May 29, 1956  J. H. POWERS  2,747,436
ROTARY CUTTING APPARATUS
Original Filed Sept. 17, 1952
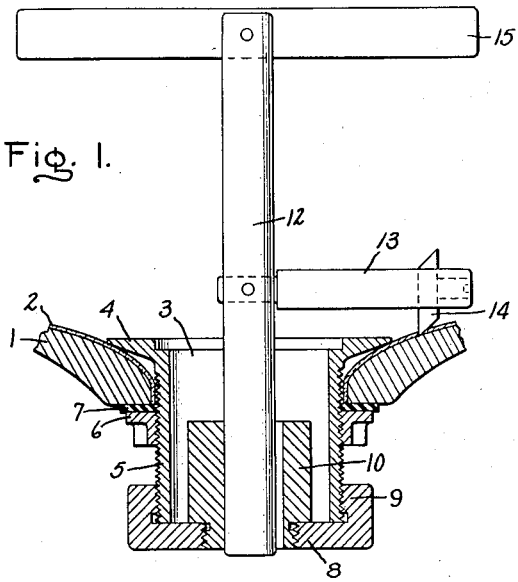
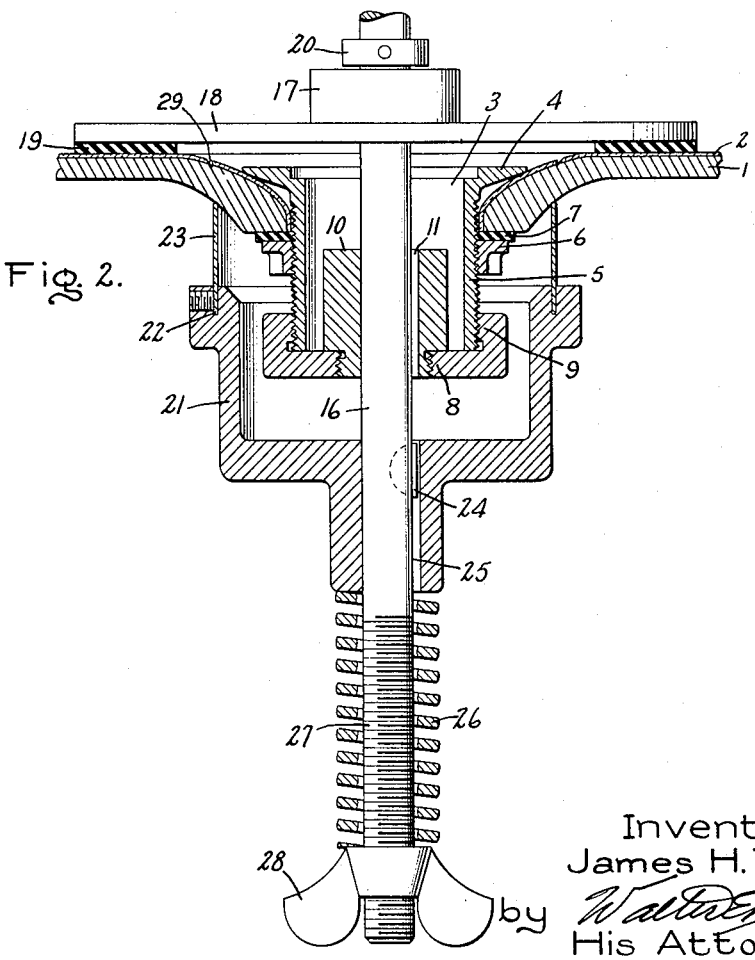
Inventor:
James H. Powers,
by Walter E. Rule
His Attorney.

United States Patent Office 2,747,436
Patented May 29, 1956

2,747,436

ROTARY CUTTING APPARATUS

James H. Powers, Anchorage, Ky., assignor to General Electric Company, a corporation of New York Original application September 17, 1952, Serial No. 310,001. Divided and this application November 2, 1953, Serial No. 389,714

3 Claims. (Cl. 77—2)

This application is a division of my application Serial No. 310,001, filed September 17, 1952.

The present invention relates to cutting apparatus, and more particularly, to apparatus for cutting circular openings in cast iron sinks and the like.

A principal difficulty involved in cutting materials having a frangible coating is the tendency of such coating to crack and flake off in the area adjacent the cut. One example of this difficulty has arisen in connection with the installation of waste food grinders in vitreous enamel coated kitchen sinks having a drain opening too small to accommodate the mounting flange of such devices. Before a waste food grinder can be installed in a sink of this type it is, of course, necessary to enlarge the drain opening sufficiently to accommodate a larger flange than was originally fitted in the opening. At the same time it is important that cracking and chipping of the vitreous enamel around the new opening be avoided.

Accordingly, a principal object of this invention is to provide apparatus for cutting circular drain openings in cast iron sinks and the like.

Another object of the invention is to provide apparatus particularly suitable for enlarging the drain opening of a sink without cracking or breaking the vitreous enamel coating on the sink wall surrounding the opening.

Further objects and advantages of my invention will become apparent as the following description proceeds and the features of novelty which characterize my invention will be pointed out with particularity in the claims annexed to and forming a part of this specification.

Briefly stated, in accordance with one aspect of my invention, I provide a rotatable cutting device adapted to be mounted in the drain opening of a kitchen sink and arranged to make a circular cut on the uncoated underside of the sink wall which is accurately located with respect.

For a better understanding of my invention, reference may be made to the accompanying drawing in which Fig. 1 is a fragmentary sectional view of a sink drain opening in which a portion of my cutting apparatus is mounted so as to support an auxiliary cutter.

Fig. 2 is similar to Fig. 1, but shows the cutting apparatus assembled in cutting position.

Referring to the drawing, the numeral 1 designates the cast iron bottom wall of a kitchen sink having a lining or coating 2 of vitreous enamel and a drain opening 3. Fitted within drain opening 3 is a flange 4 having a downwardly extending threaded portion 5 on which a flange nut 6 may be screwed to hold the flange 4 in position. A gasket 7 positioned between bottom wall 1 and flange nut 6 is provided to insure a fluid tight connection. The structure described thus far is well known and is to be taken as representative of the type of sink drain opening which may be enlarged by my improved cutting apparatus.

According to the embodiment of my invention illustrated in the drawing, a hub member 8 is mounted in drain opening 3 by means of a screw-threaded flange 9 adapted to engage threaded portion 5 of flange 4. Hub member 8 includes a shaft bearing 10 suitably secured thereto, a longitudinal slot 11 forming a keyway being provided in the bore of shaft bearing 10. As shown in Fig. 1 a device for inscribing a circular V-shaped groove in the vitreous enamel coating 2 of bottom wall 1 may be rotatably supported in hub member 8. This device comprises a shaft 12 supported for rotation in shaft bearing 10, an arm 13 fixedly secured to the mid-portion of shaft 12 and a cutting bit 14 suitably mounted adjacent the free end of arm 13. It will be understood that cutting bit 14 is formed with a sharp pointed cutting edge of a sufficiently hard material, such as tungsten carbide, to cut vitreous enamel and like material and that it is removably mounted in arm 13 so as to permit removal for sharpening or replacement. Shaft 12 may be rotated in shaft bearing 10 by means of a handle 15 rigidly secured to the upper end thereof.

Referring to Fig. 2, shaft 16 is mounted for rotation in drain opening 3, being supported therein by shaft bearing 10 and an upper shaft bearing 17 carried by a bearing support bracket 18 adapted to rest on the bottom wall 1 of the sink. As shown in the drawing, bearing support bracket 18 may be in the form of a disk having a centrally located aperture to accommodate shaft 16 and an annular washer 19 secured to its lower surface. Annular washer 19 may be formed from hard rubber or other material suitable for providing frictional engagement between bearing support bracket 18 and bottom wall 1 without scratching or marring vitreous enamel coating 2. A collar 20 is securely fastened to shaft 16 and cooperates with a horizontal face of upper shaft bearing 17 to provide vertical support for shaft 16. Mounted on the portion of shaft 16 extending below flange 4 is a cup-shaped saw blade holder 21 having an annular groove 22 arranged to accommodate a rotary saw blade 23. A Woodruff key 24 positioned in shaft 16 cooperates with slot 25 in saw blade holder 21 to provide a driving connection between shaft 16 and saw blade holder 21 while permitting axial movement of saw blade holder 21 with respect to shaft 16. Rotary saw blade 23 is maintained in cutting engagement with bottom wall 1 by a spring 26 encircling the lower threaded portion 27 of shaft 16 between saw blade holder 21 and tension adjusting wing nut 28.

In operation my invention may be utilized to enlarge the drain opening in a sink by first removing the drain pipe normally connected to threaded portion 5 of flange 4 and then removing any obstructions in drain opening 3. Hub member 8 may then be mounted in drain opening 3 by engaging screw-threaded flange 9 with threaded portion 5 of flange 4. After shaft 12 is inserted in shaft bearing 10 so as to support cutting bit 14 in cutting engagement with vitreous enamel coating 2, as shown in Fig. 1, a circular V-shaped groove 29 may be made in vitreous enamel coating 2 by rotating handle 15 about the axis of shaft 12. Groove 29 should be of a diameter slightly larger than the desired diameter of the enlarged opening and should extend entirely through the coating 2 and slightly into bottom wall 1 so as to completely sever the portions of coating 2 lying along the edges of the groove. Shaft 12 and the parts connected thereto are then removed from drain opening 3 leaving hub member 8 in place to support shaft 16 and the parts connected thereto during the next step of the cutting operation. Shaft 16 is then inserted in hub member 8 being supported by upper shaft bearing 17 and bearing support 18, rotary saw blade 23 being mounted in cutting position as shown in Fig. 2. Shaft 16, saw blade holder 21 and rotary saw blade 23 are then rotated to make a circular cut in bottom wall 1, preferably by a power drive unit (not shown) suitably connected to the upper end of shaft 16. It will be observed that upon completion of this cut, rotary saw blade 23 will emerge in the area circumscribed by V-shaped groove 29 and hence cracking and flaking of vitreous enamel coating 2 will be confined to this area.

While I have shown and described a specific embodiment of my invention, I do not desire my invention to be limited to the particular construction shown and described and I intend by the appended claims to cover all modifications within the true spirit and scope of my invention.

What I claim as new and desire to secure by Letters Patent of the United States is:

1. Apparatus for enlarging the drain opening of a sink comprising a hub assembly including a member adapted to be mounted in said drain opening and a shaft supporting bracket adapted to rest on the bottom wall of said sink, a rotatable shaft supported by said hub assembly and extending through said drain opening, a cup-shaped saw blade holder secured to said shaft for rotation therewith below the bottom wall of said sink, said holder being mounted for axial movement with respect to said shaft, a rotary saw blade secured to said holder and adapted to be rotated in cutting engagement with the lower surface of the bottom wall of said sink, and spring means cooperating with said shaft and said holder so as to urge said saw blade into cutting engagement with the bottom wall of said sink.

2. Apparatus for enlarging the drain opening of a sink comprising a hub member having a centrally located lower shaft bearing and a screw-threaded flange adapted for engagement with the screw-threaded portion of a sink drain opening flange, a bearing support bracket adapted to rest on the bottom wall of said sink, an upper shaft bearing carried by said bracket in axial alignment with said lower bearing, a rotatable shaft mounted in said bearings and supported by a collar positioned above said upper bearing, and a cutting member including a rotary saw blade mounted on said shaft below said hub member and adapted to make a circular cut in said bottom wall of said sink generally concentric with said drain opening.

3. Apparatus for enlarging the drain opening of a sink comprising a hub member having a centrally located lower shaft bearing and a screw-threaded flange adapted for engagement with the screw-threaded portion of a sink drain opening flange, a bearing support bracket adapted to rest on the bottom wall of said sink, an upper shaft bearing carried by said bracket in axial alignment with said lower bearing, a rotatable shaft mounted in said bearings and supported by a collar positioned above said upper bearing, a cup-shaped saw blade holder secured to said shaft for rotation therewith below said hub member, said holder being mounted for axial movement with respect to said shaft, a rotary saw blade secured to said holder and adapted to be rotated in cutting engagement with the lower surface of the bottom wall of said sink, and spring means cooperating with said shaft and said holder so as to urge said saw blade into cutting engagement with the bottom wall of said sink.

References Cited in the file of this patent

UNITED STATES PATENTS

| 457,227 | Sigsbee | Aug. 4, 1891 |
| 1,522,102 | Cibelli | Jan. 6, 1925 |
| 1,590,994 | Misener | June 29, 1929 |
| 2,140,192 | Thatcher | Dec. 13, 1938 |
| 2,463,024 | Del Monte et al. | Mar. 1, 1949 |
| 2,468,504 | Little | Apr. 26, 1949 |

FOREIGN PATENTS

| 120,852 | Great Britain | Nov. 28, 1918 |